United States Patent
Worrell et al.

(10) Patent No.: US 6,718,722 B2
(45) Date of Patent: Apr. 13, 2004

(54) CONSTRUCTION COMPOSITION, STRUCTURE, AND METHOD

(75) Inventors: Thomas Worrell, Taos, NM (US); John W. Szerdi, Taos, NM (US)

(73) Assignee: Dharma Properties Taos, Inc., Taos, NM (US)

(*) Notice: Subject to any disclaimer, the term of this patent is extended or adjusted under 35 U.S.C. 154(b) by 143 days.

(21) Appl. No.: 10/025,831

(22) Filed: Dec. 19, 2001

(65) Prior Publication Data

US 2002/0157336 A1 Oct. 31, 2002

Related U.S. Application Data

(60) Provisional application No. 60/256,881, filed on Dec. 20, 2000.

(51) Int. Cl.[7] .......................... E04B 2/84; C04B 28/04
(52) U.S. Cl. .............. 52/741.13; 52/742.1; 52/745.05; 52/DIG. 9; 52/309.12; 52/344
(58) Field of Search ................ 52/741.13, 741.41, 52/742.1, 745.05, DIG. 9, 344, 309.12, 309.17

(56) References Cited

U.S. PATENT DOCUMENTS

| | | |
|---|---|---|
| 1,838,203 A | 12/1931 | Wales |
| 3,676,973 A | 7/1972 | Kellert |
| 4,226,067 A | 10/1980 | Artzer |
| 4,253,288 A | 3/1981 | Chun |
| 4,288,962 A | 9/1981 | Kavanaugh |
| 4,328,037 A * | 5/1982 | Demirel et al. .............. 106/705 |
| 4,486,993 A | 12/1984 | Graham et al. |
| 4,653,243 A * | 3/1987 | Burkett ....................... 52/741.4 |
| 5,335,472 A * | 8/1994 | Phillips .................... 52/742.14 |
| 5,417,023 A * | 5/1995 | Mandish ...................... 52/348 |
| 5,522,194 A * | 6/1996 | Graulich .................... 52/309.4 |
| 5,555,698 A * | 9/1996 | Mandish .................. 52/745.17 |
| 5,647,180 A * | 7/1997 | Billings et al. ............... 52/268 |
| 5,724,783 A * | 3/1998 | Mandish .................. 52/745.05 |
| 5,906,081 A * | 5/1999 | Mantyla ..................... 52/344 |
| 5,921,046 A | 7/1999 | Hammond, Jr. |
| 6,042,305 A * | 3/2000 | Novich et al. .............. 405/266 |
| 6,061,986 A * | 5/2000 | Canada ........................ 52/561 |
| 6,112,489 A * | 9/2000 | Zweig ....................... 52/405.1 |
| 6,226,942 B1 * | 5/2001 | Bonin ..................... 52/309.12 |
| 6,485,561 B1 * | 11/2002 | Dattel ........................ 106/679 |
| 2003/0029107 A1 * | 2/2003 | Ritter et al. ............. 52/309.11 |

FOREIGN PATENT DOCUMENTS

| | | | |
|---|---|---|---|
| CA | 2194193 | 6/1998 | |
| DE | 848 858 | 9/1952 | |
| FR | 2 429 878 | 1/1980 | |
| JP | 08 073849 | 3/1996 | |
| WO | WO 96/11309 | 4/1996 | |
| WO | WO 02/50384 A1 * | 6/2002 | ............. E04B/2/84 |

* cited by examiner

Primary Examiner—Robert Canfield
(74) Attorney, Agent, or Firm—Allen, Dyer, Doppelt, Milbrath & Gilchrist, P.A.

(57) ABSTRACT

A fortified adobe-type construction composition includes soil, from about 12 to about 14 parts; water, from about 3 to about 4 parts; flyash, from about 2 to about 4 parts; and cement, from about 1 to about 2 parts. A wall structure includes a frame structure having spaced-apart frame elements and a support structure affixed thereto to form an interior space. A core material resides within the space, and the overlay composition is applied to an exterior surface. A method of constructing a building element includes the steps of erecting a frame structure comprising spaced-apart frame elements and affixing a support structure to the elements to form an interior space. A core material is inserted into the support structure interior space, and the overlay composition is applied to an exterior surface of the support structure.

34 Claims, 6 Drawing Sheets

CONSTRUCTION COMPOSITION, STRUCTURE, AND METHOD

CROSS-REFERENCE TO RELATED APPLICATION

This application claims priority from commonly owned provisional application Serial No. 60/256,881, filed Dec. 20, 2000, "Wall System Composition and Structure," the disclosure of which is incorporated herein by reference.

BACKGROUND OF THE INVENTION

1. Field of the Invention

The present invention relates to construction compositions, systems, and methods and, more particularly, to such compositions, systems, and methods for walls.

2. Description of Related Art

Concrete is the most widely used construction material in the world at present, comprising portland cement, water, fine and coarse aggregates, and a small amount of air. Portland cement is a mixture of tricalcium silicate, tricalcium aluminate, and dicalcium silicate, with small amounts of magnesium and iron compounds and sometimes gypsum.

Concrete mixtures are usually specified in terms of the dry-volume ratios of cement, sand, and coarse aggregates; for example, a 1:2:3 mixture consists of one part cement, two parts sand, and three parts coarse aggregate by volume. These proportions are variable for producing desired properties, such as strength and durability. The amount of water added is about 1–1.5 times the volume of the cement.

Concrete may be cast in place, prefabricated, or sprayed onto a surface using the shotcrete method. When concrete is sprayed from both sides onto a lattice of steel posts woven with bands of steel and paper, it is referred to as gunnite.

Cement, however, is not an environmentally neutral material. In the manufacture of cement, carbon dioxide is released into the atmosphere, and cement kilns burn hazardous waste, being a source of dioxins and mercury emissions into the atmosphere. Cement is an energy-intensive construction material, and its production produces malignant particulate matter, a presumptive cause of increased rates of cancer, asthma, lung disease, and skin disease in cement workers. Cement also pollutes water, with wash water from ready-mix plants highly alkaline and containing toxic cement kiln dust.

Kellert (U.S. Pat. No. 3,676,973) teaches the spraying of concrete onto a wire-screen-enmeshed insulation panel for modular building construction. Artzer (U.S. Pat. No. 4,226,067) discloses a lightweight structural panel comprising a plastic filler reinforced by wire lattice structures, compressed, and coated with a substance such as concrete or plastic. Chun (U.S. Pat. No. 4,253,288) describes a panel formed of wire meshes joined by wires and backing, insulation material sprayed onto the panels, and wall covering applied over the insulation. Kavanaugh (U.S. Pat. No. 4,288,962) teaches the spraying of polyurethane foam between I-beam flanges and then applying a fiberglass-cement mixture to form a surface. Hammond (U.S. Pat. No. 5,921,046) discloses a panel comprising a foam core with a thin coating of plastic resin or acrylic and portland cement for structural rigidity.

SUMMARY OF THE INVENTION

It is therefore an object of the present invention to provide a construction composition that is low cost and aesthetically pleasing.

It is a further object to provide such a composition that incorporates indigenous materials.

It is another object to provide such a composition that is not labor-intensive to install.

It is an additional object to provide a structure incorporating the construction composition.

It is yet a further object to provide a method of making a construction composition.

It is yet another object to provide a method of making a structure incorporating the construction composition.

It is yet an additional object to provide a composition and method for recycling flyash into a useful construction composition.

It is yet also an object to provide compositions for slab and tile materials.

These and other objects are achieved by the present invention, a construction composition consisting essentially of soil, from about 12 to about 14 parts; water, from about 3 to about 4 parts; flyash, from about 2 to about 4 parts; and cement, from about 1 to about 2 parts.

The invention also includes a wall structure comprising a frame structure that comprises a plurality of spaced-apart frame elements and a support structure affixed to the spaced-apart elements to form an interior space. A core material resides within the support structure interior space, and the above-described overlay composition is applied to an exterior surface of the support structure.

The invention further includes a method of constructing a building element comprising the steps of erecting a frame structure comprising a plurality of spaced-apart frame elements and affixing a support structure to the frame elements to form an interior space. A core material is inserted into the support structure interior space, and the overlay composition is applied to an exterior surface of the support structure.

The invention additionally comprises embodiments of the composition for use in slabs and tiles.

The composition of the present invention uses 20–50% of the total amount of cement required in standard concrete mixtures known in the art.

The features that characterize the invention, both as to organization and method of construction, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
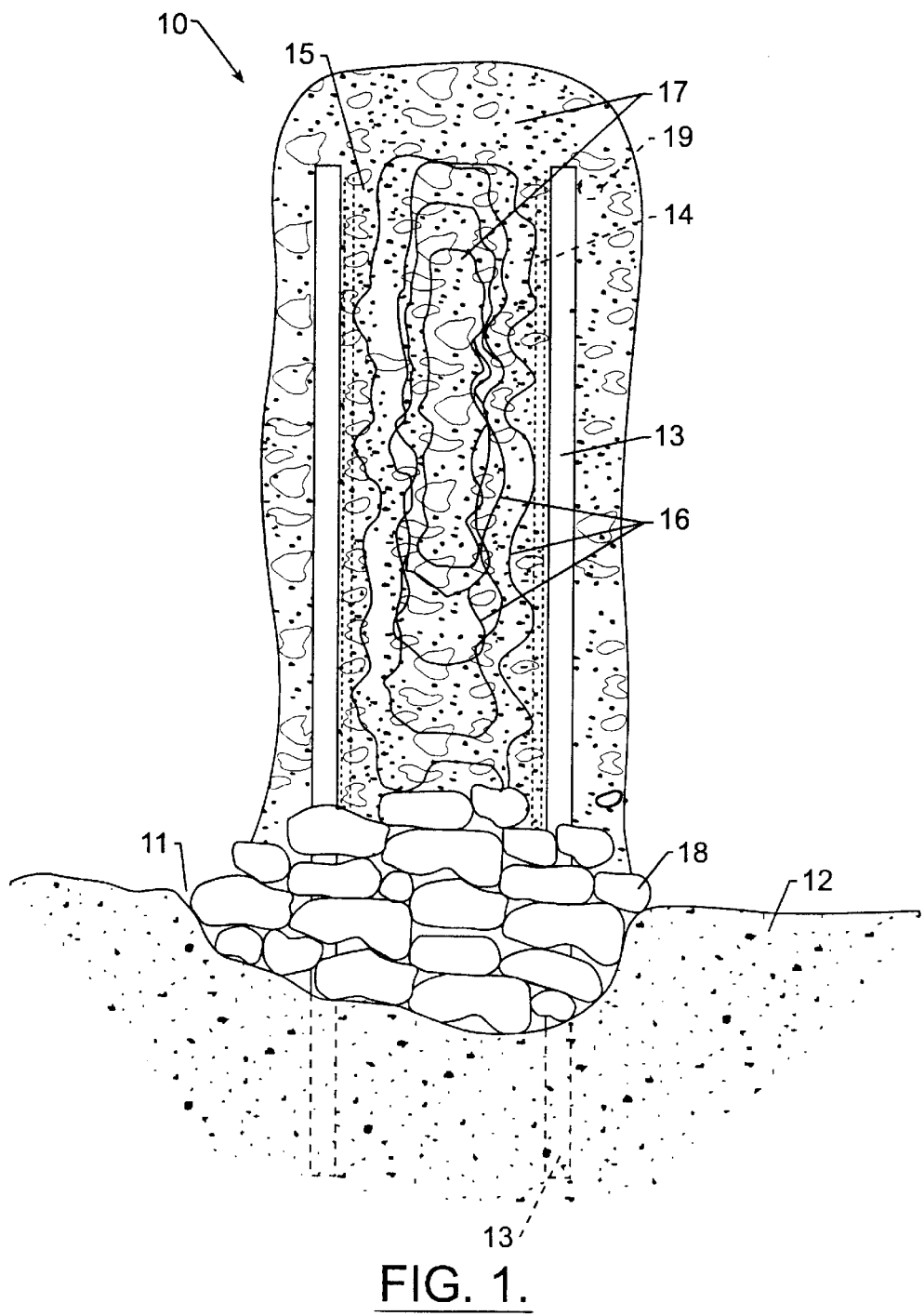
FIG. 1 is a cross-sectional view of an exemplary wall construction of the present invention.
Figure 2:
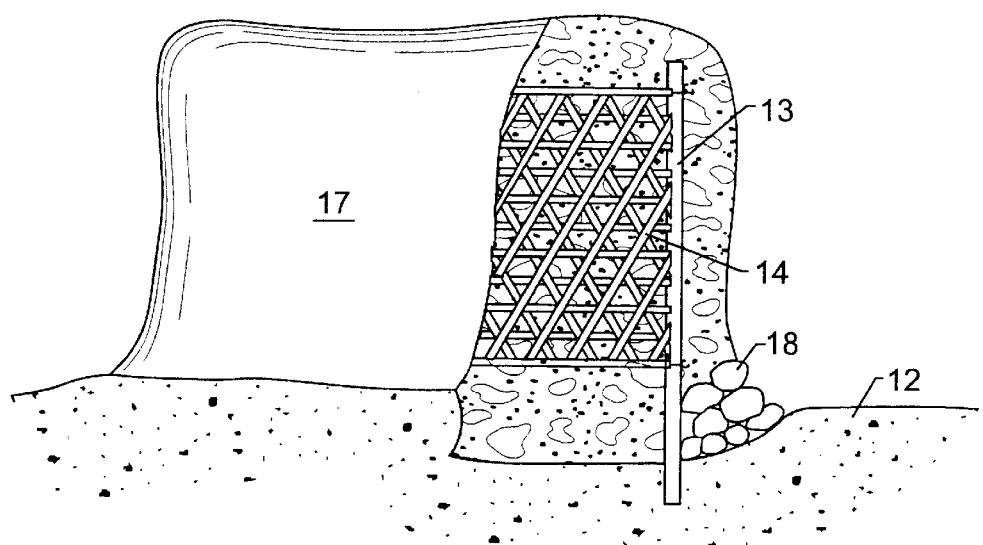
FIG. 2 is a lateral, partially cutaway, view of the wall construction of FIG. 1.
Figure 3:
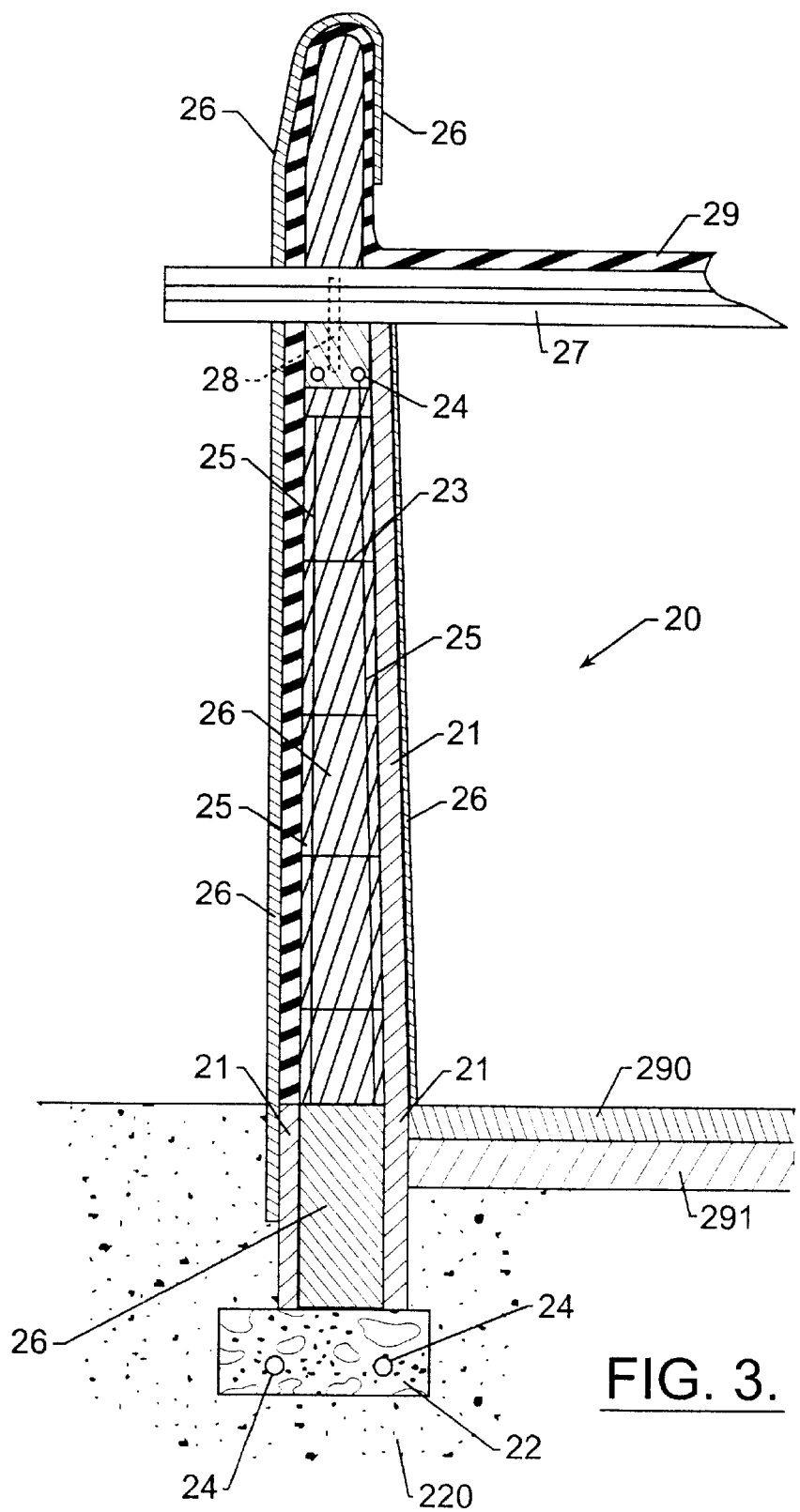
FIG. 3 is a cross-sectional view of an alternate wall construction.
Figure 4:
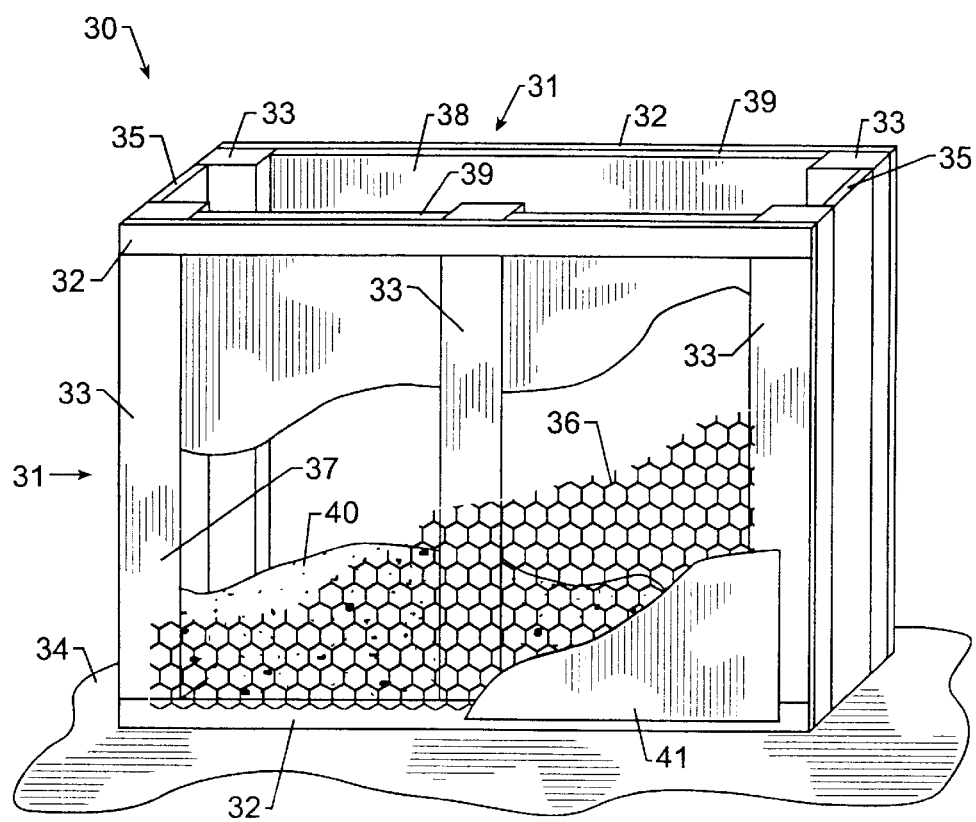
FIG. 4 is a perspective, partially cutaway, view of a third embodiment of the invention.
Figure 5:
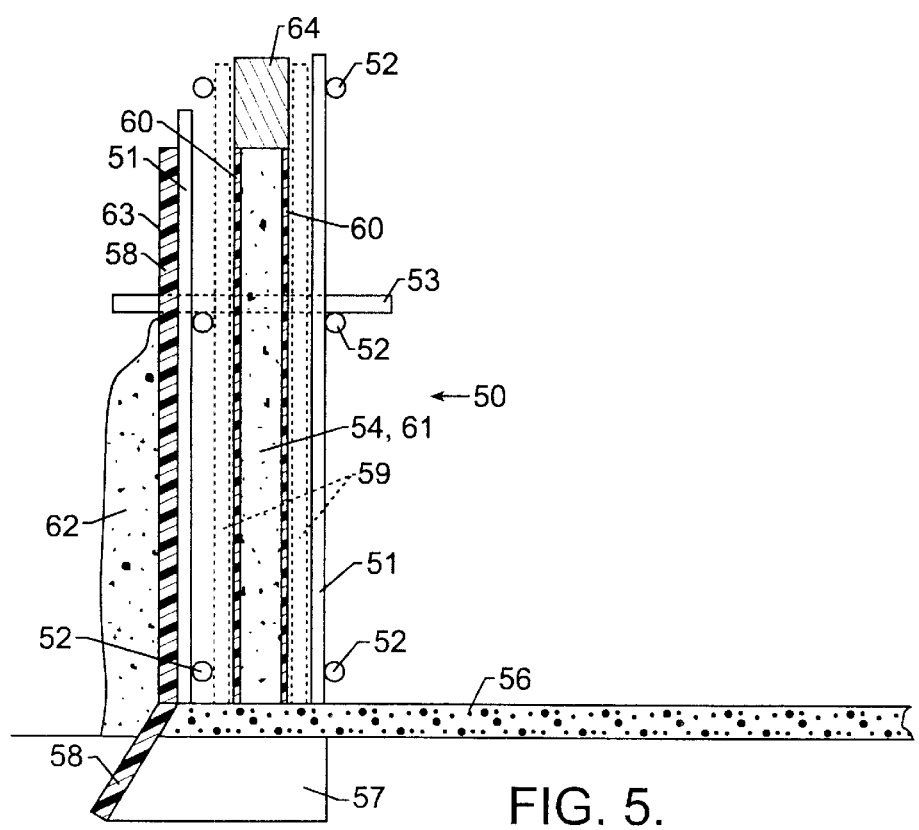
FIG. 5 is a cross-sectional view of a fourth wall construction.
Figure 6:
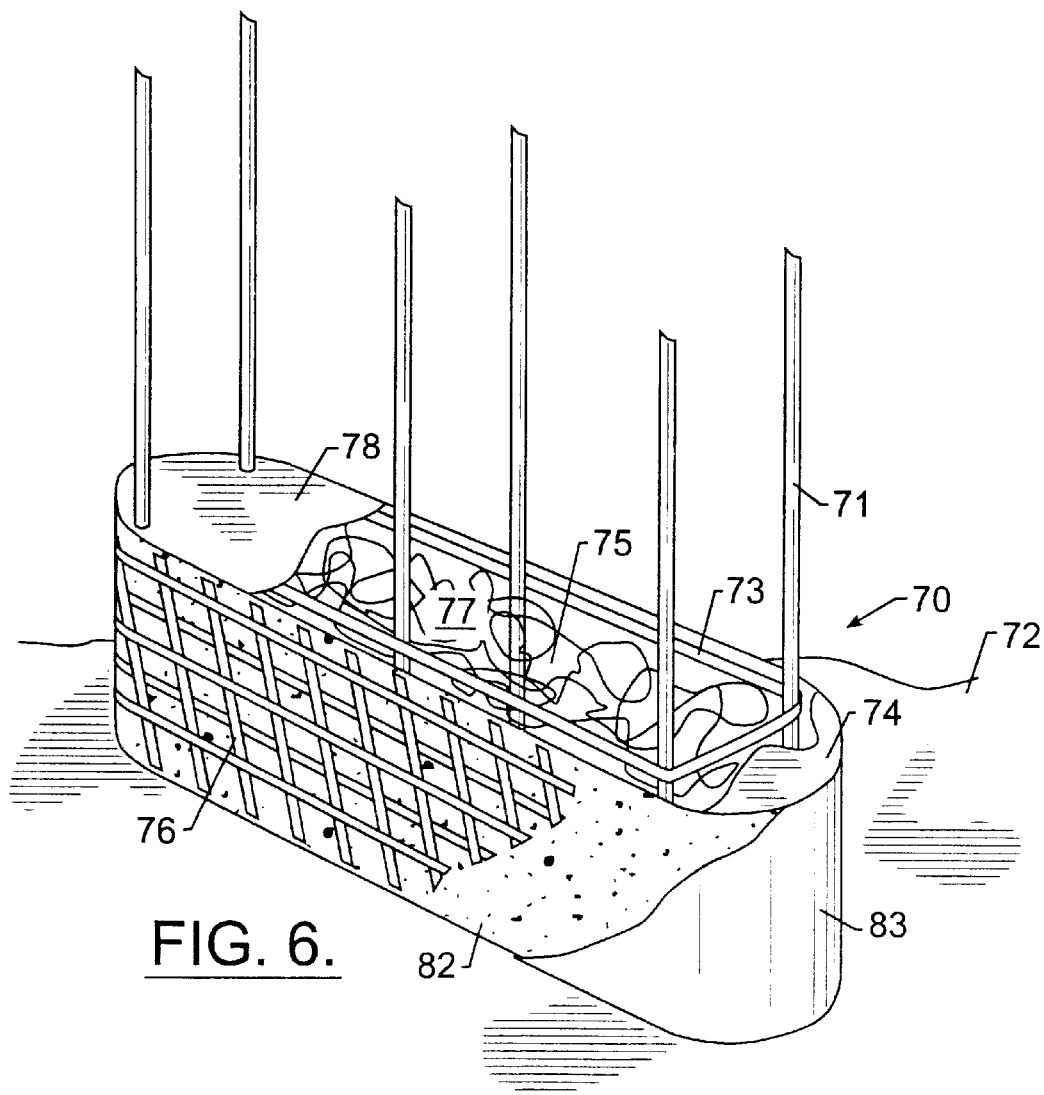
FIG. 6 is an end-plan perspective view of a partially enclosed, partially cutaway fifth wall construction.

A description of the preferred embodiments of the present invention will now be presented with reference to FIGS. 1–6. It should be noted that the following embodiments are directed to wall structures, compositions therefor, and methods of making same; however, it will be understood by one of skill in the art that other constructions and building elements may be contemplated without departing from the scope of the invention.

The construction composition of the present invention, which comprises a fortified adobe-type composition, consists essentially of soil, from about 12 to about 14 parts; water, from about 3 to about 4 parts; flyash, from about 2 to about 4 parts; and cement, from about 1 to about 2 parts. In a most preferred embodiment for use on walls, the proportions are, in vol %: silver fines, 29.8; brown fines, 29.8; water, 23.2; flyash (class F), 12.4; and cement (type I-II portland), 2.8. Entrapped air accounts for 2 vol %. The water-to-cementitious ratio is 0.65, and the aggregate-to-cementitious ratio is 4.33. For batching, mixing water should be added to obtain a slump between 2 and 3 inches. The measured properties of this mix are: slump, 2–3 inches; compressive strength, 1000 psi; unit weight, 133.0 pcf; and set time, 35 psi at 30 min.

Another embodiment of the composition has use in plastering surfaces. The plaster composition has the following proportions, in vol %: plaster sand, 61.7; water, 18.8; flyash (class F), 13.7; and cement (type I-II portland), 3.8. Entrapped air accounts for 2 vol %. The water-to-cementitious ratio is 0.45, and the aggregate-to-cementitious ratio is 3.8. For batching, mixing water should be added to obtain a slump between 3 and 4 inches. The measured properties of this mix are: slump, 2–3 inches; compressive strength, 1200 psi at 28 days, brick strength, and 750 psi at 28 days, cylinder strength; unit weight, 137.0 pcf; and set time, 21 psi at 30 min.

A further embodiment of the composition has use as a slab mix. The slab mix composition has the following proportions, in vol %: sand, 39.9; water, 17.9; flyash (class F), 6.5; ¾-in. aggregate, 26.6; and cement (type I-II portland), 7.1. Entrapped air accounts for 2 vol %. The water-to-cementitious ratio is 0.49. For batching, mixing water should be added to obtain a slump between 4 and 6 inches. The measured properties of this mix are: slump, 4–6 inches; compressive strength, 2000 psi at 28 days, cylinder strength; and unit weight, 141.7 pcf.

An additional embodiment of the composition has use as a tile mix. The tile mix composition has the following proportions, in vol %: sand, 39.9; water, 17.9; flyash (class F), 6.5; ⅜-in. aggregate, 26.6; and cement (type I-III portland), 7.1. Entrapped air accounts for 2 vol %. The water-to-cementitious ratio is 0.49. For batching, mixing water should be added to obtain a slump between 4 and 6 inches. The measured properties of this mix are: slump, 4–6 inches; compressive strength, 2000 psi at 28 days, cylinder strength; and unit weight, 141.7 pcf.

The following table contains mix component ranges in vol % for the different embodiments of the construction material of the present invention, although these are not intended as limitations on the invention:

| Mix components (vol %) | Wall mix | Plaster mix | Slab mix | Tile mix |
| --- | --- | --- | --- | --- |
| Type I–II Portland cement | 2.00–3.00 | 2.50–4.00 | 6.00–8.00 | 6.00–8.00 |
| Class F fly ash | 12.00–13.00 | 13.00–14.00 | 6.00–7.00 | 6.00–7.00 |
| Silver fines | 28.00–30.00 | | | |
| Brown fines | 28.00–30.00 | | | |
| Plaster sand | | 60.00–62.00 | | |
| Concrete sand | | | 38.00–40.00 | 38.00–40.00 |
| ⅜ in. aggregate | | | 25.00–27.00 | |
| ¾ in. aggregate | | | | 25.00–27.00 |
| Water | 22.00–24.00 | 17.00–19.00 | 16.00–18.00 | 16.00–19.00 |
| Entrapped air | 1.00–3.00 | 1.00–3.00 | 1.00–3.00 | 1.00–3.00 |

This construction composition has the characteristics of a fortified adobe material, and has a compressive strength 2–3 times that of normal adobe masonry, and 1.5 times that of pumice-crete. It is believed that the use of flyash adds strength, resistance to moisture penetration, and material flowability. Since the material is pourable integrally, there are no mortar joints. Since only a relatively small amount of cement is used in the composition, strength is not predominantly achieved by hydration, but rather by air drying.

A first embodiment of the invention includes wall structure 10 (FIGS. 1 and 2) that is set into an elongated ditch 11 in soil 12. A frame structure comprises a plurality of spaced-apart frame elements, which in turn comprise a plurality of posts 13, which may comprise steel fence posts or tee-type posts, although this is not intended as a limitation. The posts 13 are driven into the soil 12 at the bottom of the ditch 11 to a depth of approximately 24–36 inches to form two substantially parallel rows thereof. In a particular embodiment the posts 13 are set in staggered pairs at a separation of approximately 10 to 12 inches apart and spaced 8 feet on center.

A plurality of stones 18 or rubble fill the ditch 11 around the posts 13 for providing additional support to the frame structure. The stones form a mound having a level above a level of surrounding ground toward a center of the ditch 11 of approximately 12–18 inches, the mound sloping downward toward opposed edges of the ditch 11.

In one subembodiment a rebar top edge 19, for example, a ½-inch bar, may be wired to the posts 13 with wire or other means. In another subembodiment the rebar 19 is not present.

A support structure comprising in this embodiment a wire mesh 14, such as a hog wire mesh, is affixed to the posts 13, such as by wire or other means known in the art. The wire mesh 14 is affixed in covering relation to the two rows of posts 13 to form two substantially parallel mesh walls, the void therebetween forming an interior space 15 of approximately 10–12 inches.

A core material 16 is positioned within the support structure's interior space 15. In a preferred embodiment the core material 16 comprises a dried plant material such as sagebrush or straw, although this is not intended as a limitation. Other possible core materials comprise at least one of a recyclable material, such as sheared plastic, and a filler-insulating material, such as air-entrapped (gunned) fibrous (paper) material. Depending upon the environment, other recyclable material may be used, such as straw. Preferably the core material 16 contains voids therein. The construction composition is also sprayed into the interior space 15 to fill at least some of the core material voids, which immediately provides lateral stability to the frame components.

An overlay composition 17 is applied to an exterior surface of the support structure, the overlay composition comprising the construction composition of the present invention as disclosed above. The overlay composition 17 may also be applied to the stones 18, or they may be exposed for aesthetics. In a preferred embodiment the composition is sprayed onto an exterior surface of the wire mesh 14. The total wall thickness ranges from about 16 to about 24 inches, with a recommended thickness comprising approximately one-fourth of the height for a free-standing wall.

In a second embodiment, an exemplary wall 20, of the invention (FIG. 3), the frame elements comprise metal bars 21 vertically affixed to a concrete footing structure 22 of a building in two substantially parallel rows. Six inches of compacted earth 220 may serve as the base for the concrete footing structure 22, which is preferably set approximately 3 feet into the ground, and has a height of approximately 1 foot. The bars 21 may comprise, for example, rebars positioned at 2-foot centers. The frame elements further comprise first horizontal ties 23, each first horizontal tie 23 attached to two metal bars 21, one metal bar 21 in each row. The horizontal ties 23 are thereby in bridging relation to the rows. Additionally, second horizontal ties 24 extend along the bar 21 rows, preferably at the top, bottom, and middle of the wall 20.

The support structure comprises a mesh material 25 that is affixed in covering relation to the two rows of bars 21 to form two substantially parallel mesh walls. A void is formed between the rows of bars 21 to form the support structure's interior space, which is bridged by the first horizontal ties 23.

The core material 26 in this embodiment 20 comprises the construction composition of the present invention, which is also sprayable onto the mesh material 25 to form the overlay 26 to approximately 1-inch thickness on both sides.

The wall 20 may support a horizontal beam 27 by use of a vertical pin 28 inserted, for example, into a predrilled hole. The beam 27 may be used to support a roof structure 29 or other element as known in the art. A floor structure 290 may also be provided made of the overlay composition, laid upon an understructure 291.

In a third embodiment 30 of the invention (FIG. 4), the frame elements comprise two frame sheets 31, each in turn comprising a pair of substantially parallel, spaced-apart beams 32. A bottom beam 32 may comprise a base plate such as is known in the art. A plurality of post elements 33 are attached in bridging and generally perpendicular relation to each pair of beams 32 for forming the frame sheets 31. A building element skeleton is formed by holding the two frame sheets 31 in substantially parallel relation to each other, such as by attaching at least one end of each frame sheet 31 to a stationary object, such as the ground 34, or by inserting spacers between and in bridging relation to the frame sheets 31, such as horizontal bars 35.

This embodiment 30 may be used in a structural role, and can accommodate fenestrations, electrical, and mechanical systems. A roof structure may be installed and, with minimal temporary coverings, the structure can proceed with construction during inclement conditions year round.

A wire mesh 36 is affixed in covering relation to an outward-facing side 37 of each frame sheet 31, a void 38 between the two frame sheets 31 comprising the interior space. Insulation 39 is applied to the wire mesh 36 of at least one of the frame sheets 31, in the form of either an insulating panel or an insulating foam sprayed onto the wire mesh 36.

In this embodiment the core material 40 comprises the construction composition of the present invention. In this embodiment the flyash component is preferably in the range of about 3 to about 4 parts. The construction composition is also sprayable onto an outward-facing side 37 of each frame sheet to form the overlay composition 41.

Preferably a two-stage application is performed, the first stage comprising the spraying of about 10–18 inches into the void 38, which provides lateral stability to the frame component and additional structural performance for gravity loads. The second stage comprises spraying the exterior and interior faces of the frame sheets 31 to a thickness of approximately 1–3 inches, adding 4–6 inches total wall thickness, as well as providing an exterior finish. The total wall thickness then will comprise approximately 12–24 inches, depending upon the requirements for the wall. The core thickness should preferably be no less than $1/12$ of the bearing wall height.

The system 30 synergy can produce a wall construction system that can be employed in all seasons of the year, is built with sustainable materials, and is built expeditiously with materials that do not require extensive labor. The system 30 has improved affordability and minimizes energy consumption with respect to both the construction and the heating and cooling of the occupied building.

In yet a fourth embodiment 50 (FIG. 5), the frame elements comprise a plurality of first bars 51 arrayed in two vertical rows and a plurality of second bars 52 attached in substantially horizontal fashion along the two rows of the first bars 51. The second bars 52 may comprise, for example, rebars. Third bars 53 span a void 54 formed by the rows of first bars 51 to secure the wall thickness, which may be in a range of 10–24 inches. The third bars 53 are positioned at, for example, 48-inch spacings along the rows of first bars 51. In a particular use of this embodiment 50, a fortified adobe slab is formed on an insulative pumice base 56, and a footing 57 is formed of a rigid urethane foam, preferably having a minimum thickness of approximately 2 inches, and having a sloped exterior face. The footing 57 is covered by an insulation 58 that extends vertically through the wall 50.

A plurality of laths 59, preferably self-furring laths, are arrayed in two substantially parallel rows and are positioned in substantially vertical fashion, with one row along each of the two rows of first bars 51. The first bars 51 are positioned in supporting relation to the laths 59, to form a void between the two rows of laths 59. Insulation 60 in the form of either an insulating panel or a sprayable insulating foam is attached to at least some of the laths 59 of at least one of the rows of laths 59.

In this embodiment 50 the core material 61 comprises the construction composition of the present invention, which is also sprayed 62 onto an outward-facing side 63 of the insulation 58.

A structural roof member may be supported on a strengthened fortified adobe layer or a bond beam 64.

In a fifth embodiment of the invention (FIG. 6), a wall 70 is formed from the frame elements comprise a plurality of posts 71 driven into soil 72 to form two substantially parallel rows. In a preferred embodiment the posts 71 comprise T-poles. A flexible bar material 73 is wrapped around the rows of posts 71 to provide reinforcement. A bar such as 3/8 rebar comprises an exemplary bar material usable for this purpose.

The support structure comprises a flexible sheathing material 74 affixed in surrounding relation to at least a bottom portion of the two rows of posts 71 to form an enclosed space 75. In a preferred embodiment, the sheathing material 74 comprises Tex Sheathing Paper, although this is not intended as a limitation.

A wire mesh 76 is affixed in surrounding relation to the sheathing material 74. A dried plant product such as straw 77 is used to fill the space 75. A top 78 is formed by cutting and folding further sheathing material 74 over the filled space 75, and further wire mesh 76 is affixed in spanning relation to the two rows of posts 71 at a top of the support structure.

Once the support structure is in place, a plastering composition 82 is sprayed onto the outward-facing sides of the support structure and to the upper surface of the wall structure top. The plastering composition 82 has been described above. Finally, the overlay composition 83 is sprayed over the plastering composition 82 to complete the wall structure 70.

An exemplary thickness of the wall 70 of this embodiment is approximately 1 foot, for heights up to 6–10 feet.

The slab mix is usable as a floor slab and wearing surface and has been designed for placing over native soils in lieu of concrete. It is able to sustain bearing wall loads and pedestrian traffic wear. The slab mix can be placed using a ready-mix truck or pumping system, and can be made in colors.

The tile mix can be applied with a portable mixing machine or ready-mix truck.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method of constructing a building element comprising the steps of:
    erecting a frame structure comprising a plurality of spaced-apart frame elements;
    affixing a support structure to the spaced-apart elements to form an interior space;
    inserting a core material into the support structure interior space; and
    applying an overlay composition to an exterior surface of the support structure, the overlay composition consisting essentially of:
      soil, from about 12 to about 14 parts;
      water, from about 3 to about 4 parts;
      flyash, from about 2 to about 4 parts; and
      cement, from about 1 to about 2 parts.

2. The method recited in claim 1, wherein the frame elements comprise a plurality of posts, and the erecting step comprises driving the posts into soil to form two substantially parallel rows thereof.

3. The method recited in claim 2, wherein the support structure comprises a wire mesh, and the affixing step comprises affixing the mesh in covering relation to the two rows of posts to form two substantially parallel mesh walls, a void therebetween comprising the support structure interior space.

4. The method recited in claim 3, wherein the core material comprises at least one of a dried plant material, a recyclable material, and a filler-insulating material, and the inserting step comprises filling the void with the core material.

5. The method recited in claim 4, wherein the dried plant material comprises at least one of sagebrush and straw.

6. The method recited in claim 1, wherein the core material comprises at least one of a dried plant material, a recyclable material, and a filler-insulating material.

7. The method recited in claim 1, further comprising the steps, prior to the erecting step, of digging an elongated ditch in soil, and, following the erecting step, of filling the ditch with stone, for providing additional support to the frame structure.

8. The method recited in claim 7, wherein the filling step comprises adding stone to a level above a level of surrounding ground toward a center of the ditch, the stone sloping downward toward opposed edges of the ditch.

9. The method recited in claim 1, wherein the overlay applying step comprises spraying the composition onto the support structure.

10. The method recited in claim 9, wherein the core material has voids therein, and further comprising the step, prior to the spraying step, of adding overlay composition into the support structure interior space atop the core material to fill at least some of the core material voids.

11. The method recited in claim 1, wherein the frame elements comprise metal bars, and wherein the erecting step comprises vertically attaching the metal bars to a footing structure of a building in two substantially parallel rows.

12. The method recited in claim 11, wherein the frame elements further comprise horizontal ties, and wherein the erecting step further comprises attaching the ties to two metal bars in bridging relation to the rows within the support structure interior space.

13. The method recited in claim 12, wherein the support structure comprises a mesh material and the affixing step comprises affixing the mesh material in covering relation to the two rows of bars to form two substantially parallel mesh walls, a void therebetween comprising the support structure interior space.

14. The method recited in claim 13, wherein the core material comprises the overlay composition.

15. The method recited in claim 14, wherein the applying step comprises spraying the overlay composition to the mesh material.

16. The method recited in claim 11, further comprising the step, prior to the erecting step, of pouring a concrete footing onto a compacted earth base below ground level, and wherein the erecting step comprises setting bottom ends of the metal bars into the concrete footing.

17. The method recited in claim 1, wherein the erecting step comprises:
    attaching a plurality of post elements in bridging relation to two pairs of substantially parallel, spaced-apart beams in generally perpendicular relation thereto to form two frame sheets; and
    holding the two frame sheets in substantially parallel relation to each other to form a building element skeleton.

18. The method recited in claim 17, wherein the affixing step comprises affixing a wire mesh in covering relation to each frame sheet, a void between the two frame sheets comprising the interior space.

19. The method recited in claim 18, wherein the affixing step further comprises attaching an insulating panel to the wire mesh of at least one of the frame sheets.

20. The method recited in claim 18, wherein the affixing step further comprises spraying an insulating foam onto the wire mesh of at least one of the frame sheets.

21. The method recited in claim 18, wherein the inserting step comprises inserting the overlay composition into the void.

22. The method recited in claim 21, wherein the applying step comprises spraying the overlay composition onto an outward-facing side of each frame sheet.

23. The method recited in claim 1, wherein the frame elements comprise bars, and the erecting step comprises positioning a plurality of bars in substantially vertical fashion in two substantially parallel rows and attaching bars in substantially horizontal fashion along the rows of vertically positioned bars.

24. The method recited in claim 23, wherein the affixing step comprises positioning two rows of laths in substantially vertical fashion, one row along each of the two rows of vertically positioned bars, the vertically positioned bars in supporting relation to the laths, to form a void between the two rows of laths.

25. The method recited in claim 24, wherein the affixing step further comprises attaching an insulating panel to at least some of the laths of at least one of the rows of laths.

26. The method recited in claim 24, wherein the affixing step further comprises spraying an insulating foam onto at least some of the laths of at least one of the rows of laths.

27. The method recited in claim 24, wherein the inserting step comprises inserting the overlay composition into the void.

28. The method recited in claim 27, wherein the applying step comprises spraying the overlay composition onto an outward-facing side of each row of vertically positioned bars.

29. The method recited in claim 1, wherein:

the frame elements comprise a plurality of posts, and the erecting step comprises driving the posts into soil to form two substantially parallel rows thereof;

the support structure comprises a flexible sheathing material, and the affixing step comprises affixing the sheathing material in surrounding relation to at least a bottom portion of the two rows of posts to form an enclosed space; and the support structure further comprises a wire mesh, and the affixing step further comprises affixing the mesh in surrounding relation to the sheathing material.

30. The method recited in claim 29, wherein the erecting step further comprises wrapping a flexible bar material around the rows of posts to provide reinforcement.

31. The method recited in claim 30, wherein the core material comprises at least one of a dried plant material, a recyclable material, and a filler-insulating material.

32. The method recited in claim 31, further comprising forming a building element top, comprising the step of affixing further sheathing material and further wire mesh in spanning relation to the two rows of posts at a top of the support structure.

33. The method recited in claim 32, wherein the applying step comprises spraying the overlay composition to outward-facing sides of the support structure and to an upper surface of the building element top.

34. The method recited in claim 33, wherein the spraying step comprises performing two spraying steps:

a first spraying step comprising using a plastering composition consisting essentially of: plaster sand, 61.7 vol %; water, 18.8 vol %; flyash, 13.7 vol %; and cement, 3.8 vol %; and a second spraying step comprising using the overlay composition.

* * * * *